(12) United States Patent
Chen et al.

(10) Patent No.: US 9,619,355 B2
(45) Date of Patent: Apr. 11, 2017

(54) BOOTING VERIFICATION METHOD OF COMPUTER AND ELECTRONIC DEVICE

(71) Applicant: Wistron Corporation, New Taipei (TW)

(72) Inventors: Cheng-Te Chen, New Taipei (TW); Wei-Chiang Tsou, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 1071 days.

(21) Appl. No.: 13/787,892

(22) Filed: Mar. 7, 2013

(65) Prior Publication Data

US 2014/0122024 A1 May 1, 2014

(30) Foreign Application Priority Data

Oct. 26, 2012 (TW) .............................. 101139673 A

(51) Int. Cl.
  *G06F 19/00* (2011.01)
  *G01V 3/00* (2006.01)
  *G06F 11/22* (2006.01)

(52) U.S. Cl.
  CPC ................. *G06F 11/2284* (2013.01)

(58) Field of Classification Search
  CPC ... G06F 11/3003; G06F 9/4401; G06F 1/3003
  See application file for complete search history.

(56) References Cited

U.S. PATENT DOCUMENTS

| | | | |
|---|---|---|---|
| 6,449,735 B1 * | 9/2002 | Edwards | G06F 11/22 714/25 |
| 7,050,921 B2 | 5/2006 | Sutton | |
| 8,086,838 B2 | 12/2011 | Harmer | |

(Continued)

FOREIGN PATENT DOCUMENTS

| | | |
|---|---|---|
| CN | 101192181 A | 6/2008 |
| TW | 200305824 A | 11/2003 |

(Continued)

OTHER PUBLICATIONS

TW Office Action dated Dec. 24, 2014.

(Continued)

*Primary Examiner* — Phil Nguyen
(74) *Attorney, Agent, or Firm* — McClure, Qualey & Rodack, LLP

(57) ABSTRACT

A booting verification method for a computer and an electronic device are provided. The booting verification method includes the following steps. Whether a manufacturing mode indication is present is determined. The manufacturing mode indicator is established and the manufacturing mode indicator is set to a predetermined value if the manufacturing mode indicator is absent, where the predetermined value is greater than or equal to 1. Whether the manufacturing mode indicator is greater than 0 is determined if the manufacturing mode indicator is present. A manufacturing booting mode is entered and the manufacturing mode indicator is decreased if the manufacturing mode indicator is greater than 0. A normal booting mode is entered if the manufacturing mode indicator is not greater than 0.

20 Claims, 3 Drawing Sheets

(56) References Cited

U.S. PATENT DOCUMENTS

| | | | |
|---|---|---|---|
| 2009/0265792 A1* | 10/2009 | Martinez | G06F 21/572 726/29 |
| 2009/0318134 A1* | 12/2009 | Chao | G06F 9/4408 455/425 |
| 2010/0042821 A1* | 2/2010 | Harmer | G06F 9/4411 713/2 |
| 2012/0210113 A1* | 8/2012 | Wood | G06F 21/575 713/2 |

FOREIGN PATENT DOCUMENTS

| | | |
|---|---|---|
| TW | 200825719 A | 6/2008 |
| TW | 201001180 A | 1/2010 |
| TW | 201100820 A1 | 1/2011 |
| TW | 201107967 A1 | 3/2011 |
| TW | I354889 | 12/2011 |

OTHER PUBLICATIONS

English translation of TWI354889 (Published Dec. 21, 2011).
Partial English translation of TW Office Action dated Dec. 24, 2014.
SIPO Office Action dated Jun. 17, 2016 in Chinese application (No. 201210453585.3).
English translation of SIPO Office Action dated Jun. 17, 2016 in Chinese application (No. 201210453585.3).
TW Office Action dated Sep. 30, 2014.
Partial English translation of TW Office Action dated Sep. 30, 2014.
Partial English translation of TW201107967 (Published Mar. 1, 2011).
Partial English translation of TW201100820 (Published Jan. 1, 2011).
Partial English translation of TW200825719 (Published Jun. 16, 2008).
Partial English translation of TW201001180 (Published Jan. 1, 2010).

* cited by examiner

US 9,619,355 B2

BOOTING VERIFICATION METHOD OF COMPUTER AND ELECTRONIC DEVICE

This application claims the benefit of Taiwan application Serial No. 101139673, filed Oct. 26, 2012, the subject matter of which is incorporated herein by reference.

BACKGROUND OF THE INVENTION

Field of the Invention

The invention relates in general to a verification method of a computer and an electronic device, and more particularly to a booting verification method of a computer and an electronic device.

Description of the Related Art

Accompanying advancements in technologies, various electronic products are constantly progressing. In the recent years, many electronic products carrying operating systems to function as smart electronic products have become prevalent. Such electronic products need to undergo numerous verification procedures during a factory manufacturing process in order to ensure product quality.

The booting verification procedure, as a crucial quality control step, ensures whether hardware components carried by the electronic products are functional after waking up the hardware components by an operating system without obstructing the booting procedure.

Conventionally, when factory verification staff encounters a booting failure of an electronic product, it is necessary to disassemble or replace hardware components of the electronic product to confirm whether the booting failure of the electronic product is associated with the hardware components. The above verification procedure is not only complicated and time-consuming, but also likely damages the electronic product during the disassembly process.

SUMMARY OF THE INVENTION

The invention is directed to a booting verification method of a computer and an electronic device, which control the computer whether to enter a manufacturing booting mode by utilizing a manufacturing mode indicator, and directly set switches and configuration values of various hardware components through a manufacturing mode configuration menu. Thus, verification staff is capable of ensuring whether a booting failure of the computer is associated with a particular hardware component without disassembling or replacing the hardware component of the computer.

According to an aspect of the present invention, a booting verification method of a computer is provided. The booting verification method includes the following steps. Whether a manufacturing mode indicator is present is determined. The manufacturing mode indicator is established and the manufacturing mode indicator is set to a predetermined value if the manufacturing mode indicator is absent, where the predetermined value is greater than or equal to 1. Whether the manufacturing mode indicator is greater than 0 is determined if the manufacturing mode indicator is present. A manufacturing booting mode is entered and the manufacturing mode indicator is decreased if the manufacturing mode indicator is greater than 0. A normal booting mode is entered if the manufacturing mode indicator is not greater than 0.

According to another aspect of the present invention, an electronic device is provided. The electronic device includes a determining unit, a storing unit, a configuring unit and a controlling unit. The determining unit determines whether a manufacturing mode indicator is present. The configuring unit establishes the manufacturing mode indicator in the storing unit and sets the manufacturing mode indicator to a predetermined value if the manufacturing mode indicator is absent. The predetermined value is greater than or equal to 1. The determining unit further determines whether the manufacturing mode indicator is greater than 0 if the manufacturing mode indicator is present. The controlling unit controls the computer to enter a manufacturing booting mode and to decrease the manufacturing mode indicator if the manufacturing mode indicator is greater than 0. The controlling unit controls the computer to enter a normal booting mode if the manufacturing mode indicator is not greater than 0.

The above and other aspects of the invention will become better understood with regard to the following detailed description of the preferred but non-limiting embodiments. The following description is made with reference to the accompanying drawings.

DETAILED DESCRIPTION OF THE INVENTION

Some embodiments are disclosed below for elaborating the invention. The following embodiments are for the purpose of elaboration only, not for limiting the scope of protection of the invention. Besides, secondary elements are omitted in the following embodiments to highlight the technical features of the invention.

Figure 1:
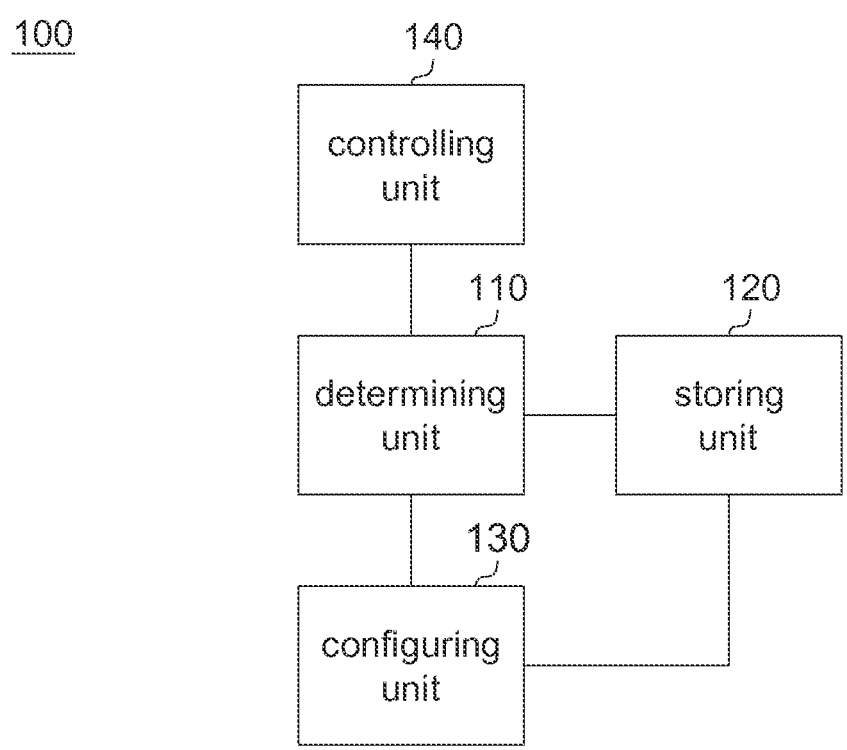
FIG. 1 is a schematic diagram of an electronic device.

FIG. 1 shows a schematic diagram of an electronic device 100 according to one embodiment. For example, the electronic device 100 is a test computer, a test tool or a test circuit board. During a manufacturing process, electronic products such as laptop computers, portable pads and mobile handsets need to undergo various booting verification tests for ensuring the electronic products can be successfully booted and are functional. Through the electronic device 100 of the embodiment, operations of the booting verification test procedures can be readily and easily performed.

The electronic device 100 includes a determining unit 110, a storing unit 120, a configuring unit 130 and a controlling unit 140. The determining unit 110 performs various determining procedures. The configuring unit 130 performs various configuring procedures. The controlling unit 140 performs various controlling procedures. For example, the determining unit 110, the configuring unit 130 and the controlling unit 140 are a chip, a firmware circuit or a computer-readable storage medium having multiple program codes. The storing unit 120 stores data, and is a Serial Peripheral Interface (SPI) flash memory, for example.

Figure 2A:
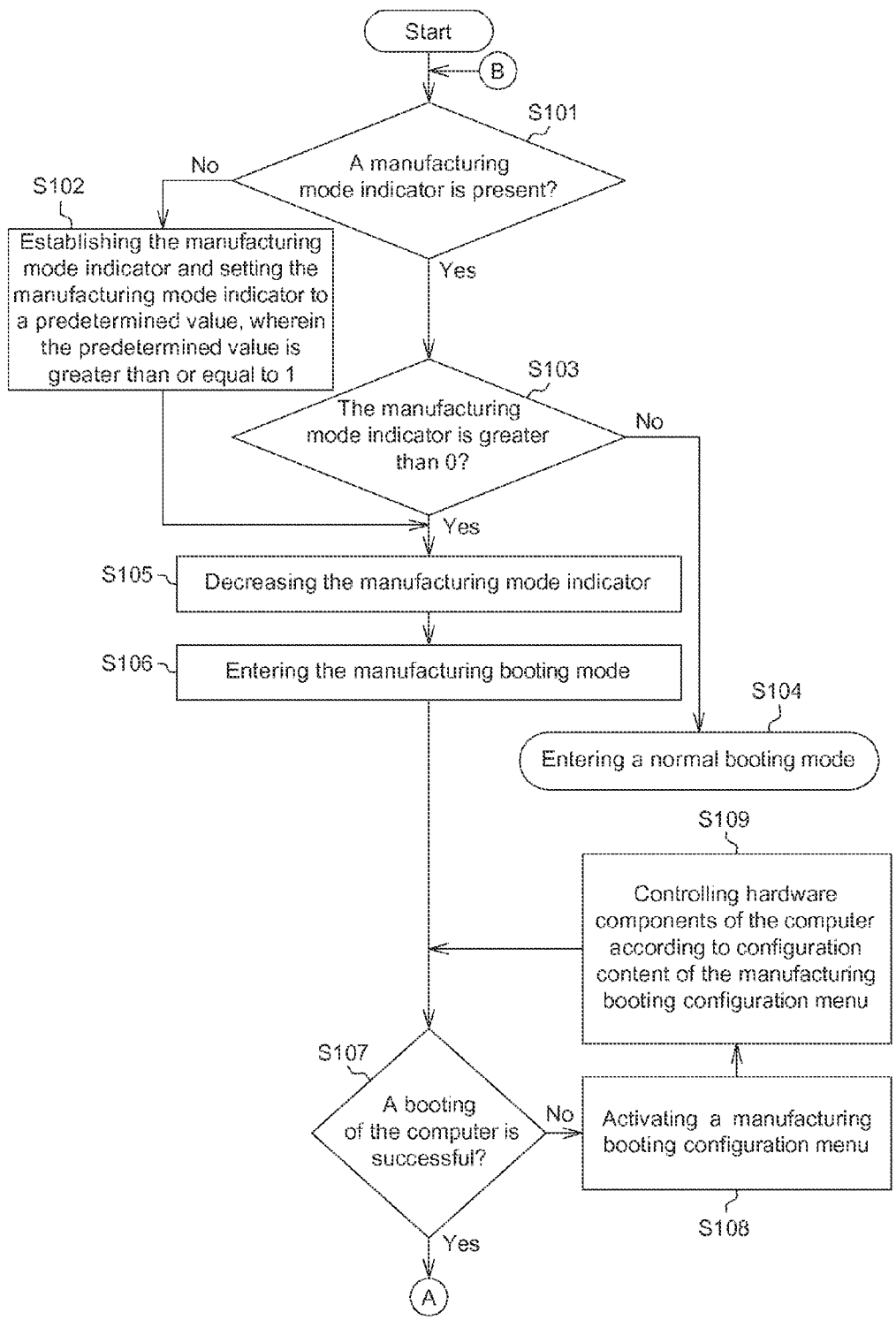
FIG. 2A and FIG. 2B are a flowchart of a booting verification method of a computer according to one embodiment.
Figure 2B:
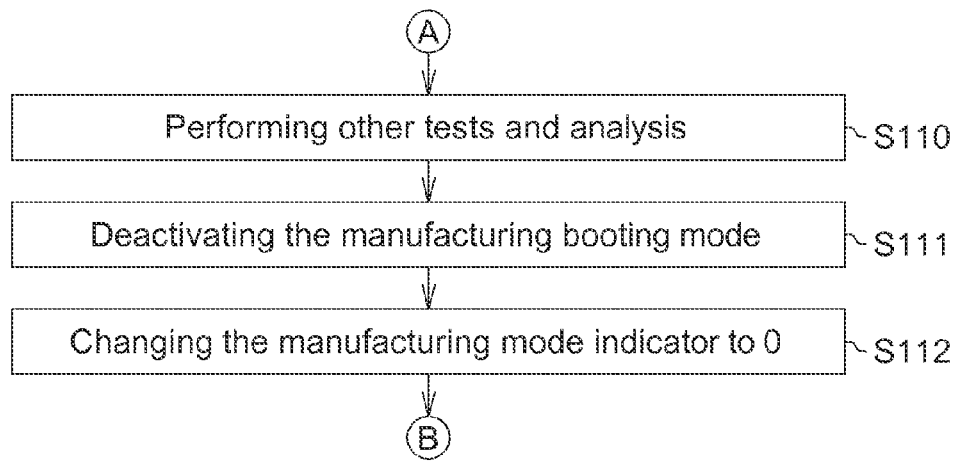

Operation details of the electronic device 100 are to be described below with reference to a flowchart. FIGS. 2A and 2B are a flowchart of a booting verification method of a computer 900 (depicted in FIG. 3). In step S101, the determining unit 110 determines whether a manufacturing code indicator is present. In the present embodiment, the determining unit 110 may determine whether the manufacturing mode indicator is present during a pre-Extensible Firmware Interface initialization (pre-EFI) phase of a Unified Extensible Firmware Interface (UEFI). In the UEFI, the manufacturing code indicator is not stored in a complementary metal-oxide semiconductor (CMOS). Taking an SPI flash memory as the storing unit 120 for example, the UEFI manufacturing code indicator stored in the SPI flash memory does not vanish after a power loss. Thus, the manufacturing code indicator remains in the storing unit 120 if the manufacturing code indicator is previously configured.

Step S102 is performed if the manufacturing code indicator is absent, or else step S103 is performed if the manufacturing code indicator is present. In step S102, the configuring unit 130 establishes the manufacturing code indicator and sets the manufacturing code indicator to a predetermined value. The predetermined value is greater than or equal to 1, e.g., 10. In the UEFI, the step is performed during a Driver Execution Environment (DXE) phase.

In step S103, the determining unit 110 determines whether the manufacturing code indicator is greater than 0. Step S105 is performed if the manufacturing code indicator is greater than 0, or else step S104 is performed if the manufacturing code indicator is not greater than 0 (e.g., the manufacturing code indicator is already decreased to 0).

In step S105, as the manufacturing code indicator is already decreased to 0, the booting verification method is no longer required, and so the controlling unit 140 controls the computer 900 to enter a normal booting mode.

In step S104, the configuring unit 130 decreases the manufacturing code indicator. The manufacturing code indicator may be sequentially decreased by 1. For example, if the manufacturing code indicator is 10, then the manufacturing code indicator becomes 9; if the manufacturing code indicator is 9, then the manufacturing code indicator becomes 8. Each time step S104 is performed, the manufacturing code indicator is decreased until the manufacturing code indicator is equal to 0. Then, step S105 is performed to enter the normal booting mode after the step S103 of determining.

In step S106, the controlling unit 140 controls the computer 900 to enter a manufacturing code mode. Various booting verification procedures may be directly performed after having entered the manufacturing booting mode.

In step S107, the determining unit 110 determines whether the computer 900 can be booted. Step S108 is performed if the booting of the computer 900 fails, or else step S110 is performed if the booting of the computer 900 is successful.

Figure 3:
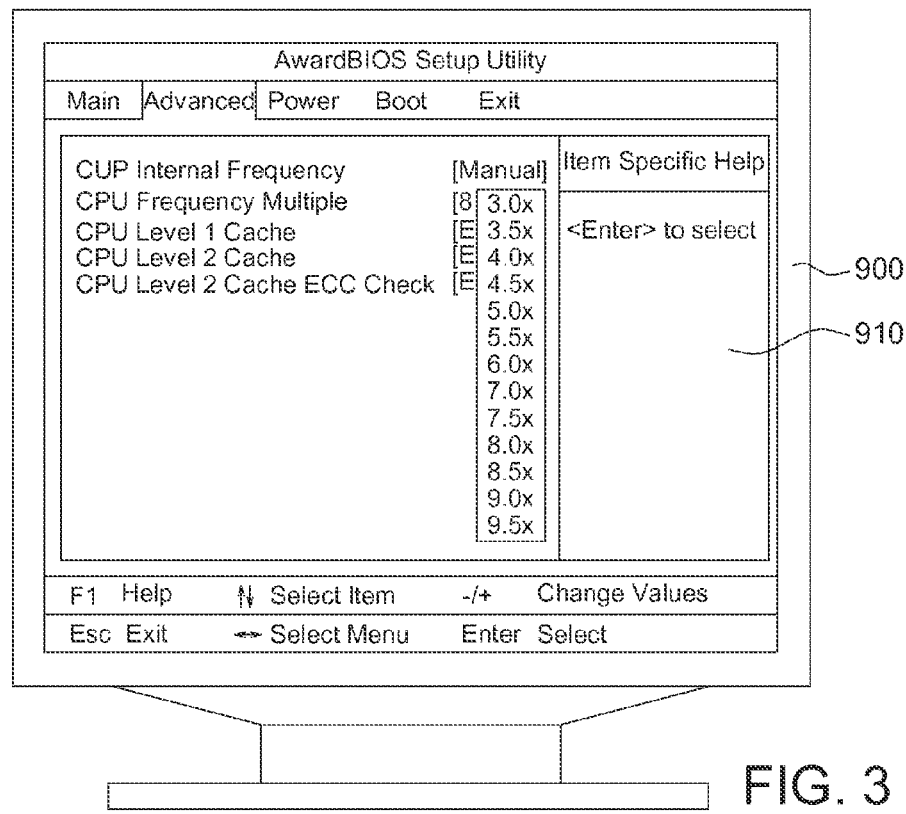
FIG. 3 is a schematic diagram of a manufacturing booting configuration menu of a computer according to one embodiment.

In step S108, the booting failure of the computer 900 indicates that a particular hardware component of the computer 900 is malfunctioning, and so the controlling unit 140 activates a manufacturing booting configuration menu 910. FIG. 3 shows a schematic diagram of the manufacturing booting configuration menu 910 of the computer 900. The manufacturing booting configuration menu 910 includes switches and configuration values of multiple hardware components. For example, the hardware components may be an IDE connector, a disk drive, a floppy drive or a USB connector.

In step S109, verification staff may directly make adjustments on the manufacturing booting configuration menu 910. The controlling unit 140 then controls the hardware components of the computer 900 according to a configuration in the manufacturing booting configuration menu 910. In this step, without being required to disassemble or replace the hardware components of the computer 900, the verification staff is allowed to confirm whether the booting failure of the computer 900 is associated with certain hardware components when entering step S107.

Hardware component configuration items predetermined in the manufacturing booting configuration menu 910 may be verified through steps S107, S108 and S109. The booting verification method enters step S110 after the above verification process is completed.

In step S110, other tests and analysis can be performed. These tests and analysis can be performed by replacing the hardware components or be tested using an automated optical tester. Step S111 is performed after completing the various verification items.

In step S111, since the computer 900 has completed the booting verification procedures, the controlling unit 140 deactivates the manufacturing booting mode. In step S112, the configuring unit 130 changes the manufacturing code indicator stored in the storing unit 120 to 0.

After recording the manufacturing code indicator to 0, step S101 is performed and followed sequentially by steps S103 and S104 to enter the normal booting mode.

In the booting verification method of the computer 900 and the electronic device 100, the computer 900 is controlled whether to enter the manufacturing booting mode by utilizing the manufacturing mode indicator, and the switches and configuration values of various hardware components are set through the manufacturing booting mode configuration menu 910. Thus, verification staff is capable of ensuring whether the booting failure of the computer 900 is associated with a particular hardware component without disassembling or replacing the hardware component of the computer 900.

Further, as the booting verification method of the computer 900 according to the embodiments is implemented based on the UEFI, the manufacturing mode indicator can be stored in the SPI flash memory, so that unexpected behaviors are not caused by a power loss of a circuit board battery (usually utilized for a real-time clock, RTC).

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A booting verification method of a computer, comprising:
    determining whether a manufacturing mode indicator is present;
    establishing the manufacturing mode indicator and setting the manufacturing mode indicator to a predetermined value if the manufacturing mode indicator is absent, wherein the predetermined value is greater than or equal to 1;
    determining whether the manufacturing mode indicator is greater than 0 if the manufacturing mode indicator is present;
    entering a manufacturing booting mode and decreasing the manufacturing mode indicator if the manufacturing mode indicator is greater than 0; and
    entering a normal booting mode if the manufacturing mode indicator is not greater than 0.

2. The method according to claim 1, wherein the manufacturing booting mode is stored in a Serial Peripheral Interface (SPI) flash memory.

3. The method according to claim 1, wherein the step of determining whether the manufacturing mode indicator is present is performed during a pre-Extensible Firmware Interface initialization (pre-EFI) phase of a Unified Extensible Firmware Interface (UEFI).

4. The method according to claim 1, wherein the step of establishing and setting the manufacturing mode indicator is performed during a Driver Execution Environment (DXE) phase of the UEFI.

5. The method according to claim 1, wherein the predetermined value is 10.

6. The method according to claim 1, wherein in the step of decreasing the manufacturing mode indicator, the manufacturing mode indicator is sequentially decreased by 1.

7. The method according to claim 1, after entering the manufacturing booting mode, further comprising:
determining whether the booting of the computer is successful;
activating a manufacturing booting configuration menu if the booting of the computer fails; and
controlling a plurality of hardware components of the computer according to a configuration content of the manufacturing booting configuration menu.

8. The method according to claim 7, wherein the manufacturing booting configuration menu comprises switches of the hardware components.

9. The method according to claim 7, wherein the manufacturing booting configuration menu comprises configuration values of the hardware components.

10. The method according to claim 7, wherein the hardware components are an IDE connector, an optical disk drive, a floppy disk drive or a Universal Serial Bus (USB) connector.

11. An electronic device, comprising:
a determining unit, for determining whether a manufacturing mode indicator is present;
a storing unit;
a configuring unit, for establishing and setting the manufacturing mode indicator in the storing unit to a predetermined value if the manufacturing mode indicator is absent, wherein the predetermined value is greater than or equal to 1; and
a controlling unit;
wherein, the determining unit further determines whether the manufacturing mode indicator is greater than 0 if the manufacturing mode indicator is present, the controlling unit controls a computer to enter a manufacturing booting mode and decreases the manufacturing mode indicator if the manufacturing mode indicator is greater than 0, and the controlling unit controls the computer to enter a normal booting mode if the manufacturing mode indicator is not greater than 0.

12. The electronic device according to claim 11, wherein the storing unit is an SPI flash memory.

13. The electronic device according to claim 11, wherein the determining unit determines whether the manufacturing mode indicator is present during a pre-EFI phase of a UEFI.

14. The electronic device according to claim 11, wherein the determining unit determines whether the manufacturing mode indicator is present during a DXE phase of a UEFI.

15. The electronic device according to claim 11, wherein the predetermined value is 10.

16. The electronic device according to claim 11, wherein the manufacturing mode indicator is sequentially decreased by 1.

17. The electronic device according to claim 11, wherein the determining unit further determines whether the booting of the computer is successful after the computer enters the manufacturing booting mode; and the controlling unit activates a manufacturing booting configuration menu if the booting of the computer fails and controls a plurality of hardware components of the computer according to a configuration content of the manufacturing booting configuration menu.

18. The electronic device according to claim 17, wherein the manufacturing booting configuration menu comprises switches of the hardware components.

19. The electronic device according to claim 17, wherein the manufacturing booting configuration menu comprises configuration values of the hardware components.

20. The electronic device according to claim 17, the hardware components are an IDE connector, an optical disk drive, a floppy disk drive or a USB connector.

* * * * *